United States Patent [19]

Powell et al.

[11] Patent Number: 5,833,127

[45] Date of Patent: Nov. 10, 1998

[54] METHOD AND APPARATUS FOR PRECISION SPIN-WELDING

[75] Inventors: Daniel Powell, Stillwater; Jay Hickey, Eden Prairie, both of Minn.

[73] Assignee: Powell McGee Associates, Inc., Shoreview, Minn.

[21] Appl. No.: 764,331

[22] Filed: Dec. 12, 1996

[51] Int. Cl.⁶ ............................................. B23K 20/12
[52] U.S. Cl. ........................ 228/102; 228/2.3; 228/9; 228/114.5; 156/73.5
[58] Field of Search .......................... 228/2.3, 9, 102, 228/114.5; 156/73.5, 358

[56] References Cited

U.S. PATENT DOCUMENTS

| | | | |
|---|---|---|---|
| 3,542,274 | 11/1970 | Miller | 228/2.3 |
| 3,840,979 | 10/1974 | Miller et al. | 228/102 |
| 3,993,519 | 11/1976 | Birkhold | 228/2.3 |
| 4,552,609 | 11/1985 | Larsen | 228/2.3 |
| 4,757,932 | 7/1988 | Benn et al. | 228/9 |

*Primary Examiner*—Patrick Ryan
*Assistant Examiner*—Jeffrey T. Knapp
*Attorney, Agent, or Firm*—Larkin, Hoffman, Daly & Lindgren, Ltd.

[57] ABSTRACT

A spin-welding apparatus utilizing a servo motor assembly has a closed-loop control circuit for rotating one part of the workpiece being welded relative to the other. In use, the servo motor immediately rotates the first part up to a set speed at which welding will occur, and a power cylinder moves the first part into frictional contact with the second part. Contact between the two parts is observed by a microprocessor interrogating a signal from the servo output corresponding to an increase in the load on the servo motor due to frictional drag between the parts, with "contact" being identified as surpassing a predetermined threshold error or variance value between the closed-loop system's input and output values. The microprocessor then counts a predetermined number of revolutions, and terminates rotation of the servo motor and first part. For accurate radial alignment between the parts, rotation may continue past the predetermined number of revolutions that fraction of a revolution necessary to achieve proper alignment or orientation.

30 Claims, 4 Drawing Sheets

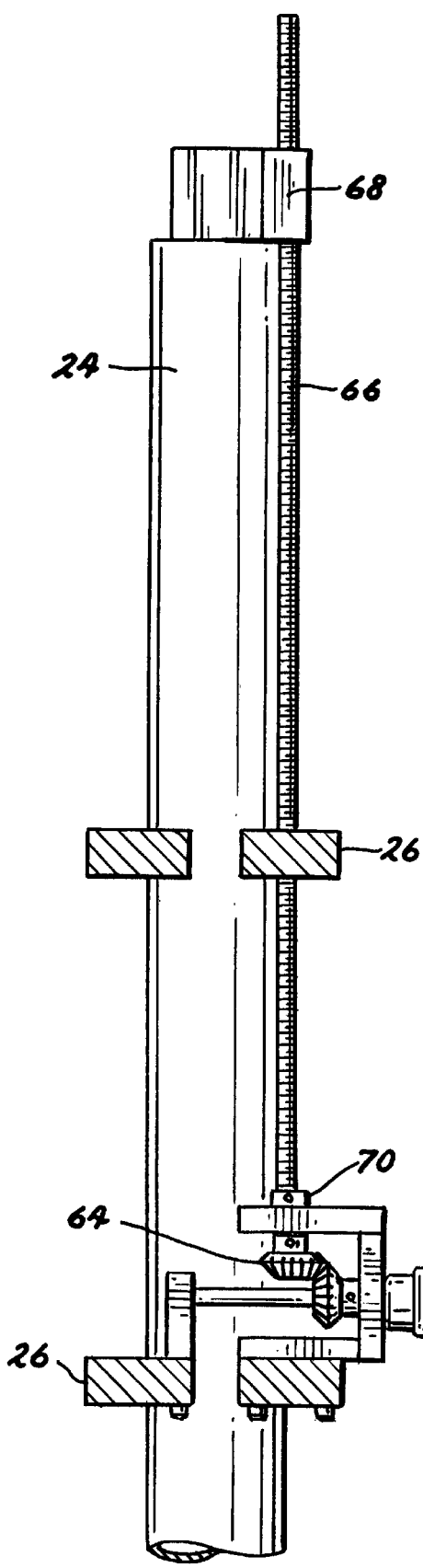
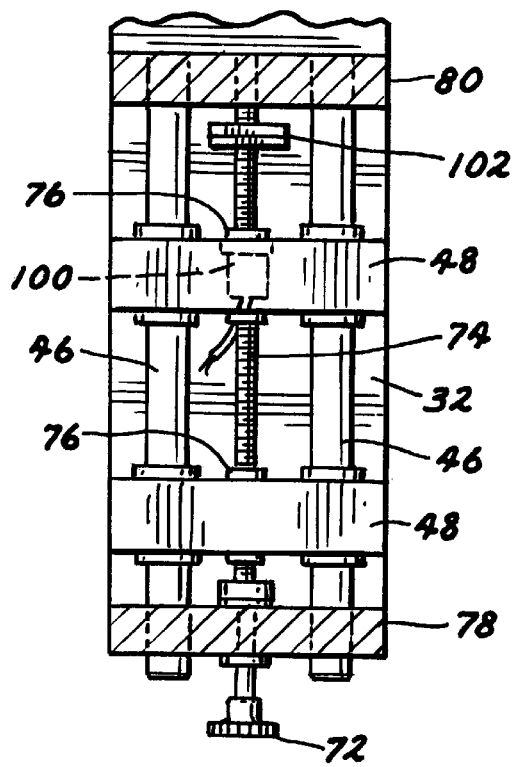
FIG. 5
FIG. 6

METHOD AND APPARATUS FOR PRECISION SPIN-WELDING

BACKGROUND OF THE INVENTION

1. Field of the Invention

The present invention relates generally to methods and apparatuses for friction- or spin-welding of plastic or thermolabile components, and particularly to a device which permits weld optimization and alignment by regulating the relative rotation of the components via a closed-loop control or "servo" system.

2. Content of the Prior Art

The field of friction-, spin-, and inertia-welding has developed significantly in recent years due to the introduction of computer controls and sensors, as well as advances in motors and other components. Despite these significant efforts, optimizing weld integrity and attaining rotational alignment between welded parts have remained two continually vexing goals.

Several attempts to improve and refine spin- or friction-welding systems are disclosed in the prior art references submitted with and listed in this specification. Two representative and instructive examples of the "state of the art" are U.S. Pat. No. 4,743,331 (Nuttall '331) and U.S. Pat. No. 4,552,609 (Larsen '609).

Nuttall '331 discloses a welding system utilizing a servo motor and microprocessor to control the system, and discusses stopping rotation of the parts using friction generated from the weld (which may optionally be assisted by a brake). The particular welding method described in the Nuttall '331 patent involves placing the two parts to be welded in stationary contact, actuating the servo motor for an initial slow ramp up to ensure proper "take-up" of the parts within their holders, followed by rapid acceleration to welding process speed, maintaining welding speed for a designated period, and then a rapid deceleration. Nuttall '331 also relies on monitoring torque during the startup to adjust thrust or pressure, which is applied continuously, and then determining the end of a weld cycle based upon elapsed time.

Larsen '609 describes a similar system in which the drive force is terminated after a desired number of revolutions, and the parts "coast down" to a slower speed at which alignment is attempted by imparting a clamping force or pressure.

Several other references such as Jones '405, Sciaky '213 and '214, Benn '932, Farmer '068, Miller '330, and Ellis '566 discuss measuring several variables associated with producing enhanced welds such as duration, axial pressure, temperature, torque, burn-off, and so forth, as well as utilizing various components including microprocessors, clutches or transmissions, and mechanisms for providing variable speed or pressure to optimize welds based upon those sensed or measured parameters.

While these references and other describe various improvements, enhancements, and modifications to the basic art of spin-, friction-, or inertia-welding, they have not yet provided the industry with an apparatus or method which permits an operator to optimize weld quality and characteristics based upon empirical inputs, and which optionally achieves essentially exact radial alignment between two welded parts while maintaining weld integrity.

SUMMARY OF THE INVENTION

The spin-welding system of this invention produces high integrity welds that may be optimized by empirical evaluation of test welds and the operator's selective variation of one or more parameters affecting weld quality. In addition, accurate radially alignment of the welded parts may be achieved without imparting counterproductive forces on the weld which would otherwise tend to denigrate or destroy the weld.

Briefly described, one embodiment of the spin-welding apparatus includes a support frame, a carriage mounted for axial movement on the support frame, a pneumatic dual acting power cylinder for imparting axial movement to the carriage, and a servo motor assembly having a closed-loop control circuit for rotating one part of the workpiece being welded relative to the other. In use, the servo motor immediately rotates the first part up to a set speed at which welding will occur, and the power cylinder moves the first part into frictional contact with the second part (normally held stationary in a mandrel). Contact between the two parts is observed by a microprocessor interrogating a signal from the servo output corresponding to an increase in the load on the servo motor due to frictional drag between the parts, with "contact" being identified as surpassing a predetermined threshold error or variance value between the closed-loop system's input and output values (for rotational speed, torque, gain, or the like). Once "contact" is observed, the microprocessor counts a predetermined number of revolutions and terminates rotation of the servo motor and first part. For accurate radial alignment between the parts (or for repeatable automated loading of parts into the respective holders), rotation may continue past the predetermined number of revolutions that fraction of a revolution necessary to achieve proper alignment or orientation.

BRIEF DESCRIPTION OF THE DRAWINGS

FIG. 5 is a partially broken away detail rear elevation view of the stroke path adjustment control of the spin-welding machine of FIG. 1 taken through line 5—5 in FIG. 4; and FIG. 6 is a partially broken away detail side elevation view of the height adjustment control of the spin-welding machine of FIG. 1 taken through line 6—6 in FIG. 4.

DETAILED DESCRIPTION OF THE PREFERRED EMBODIMENTS

Figure 1:
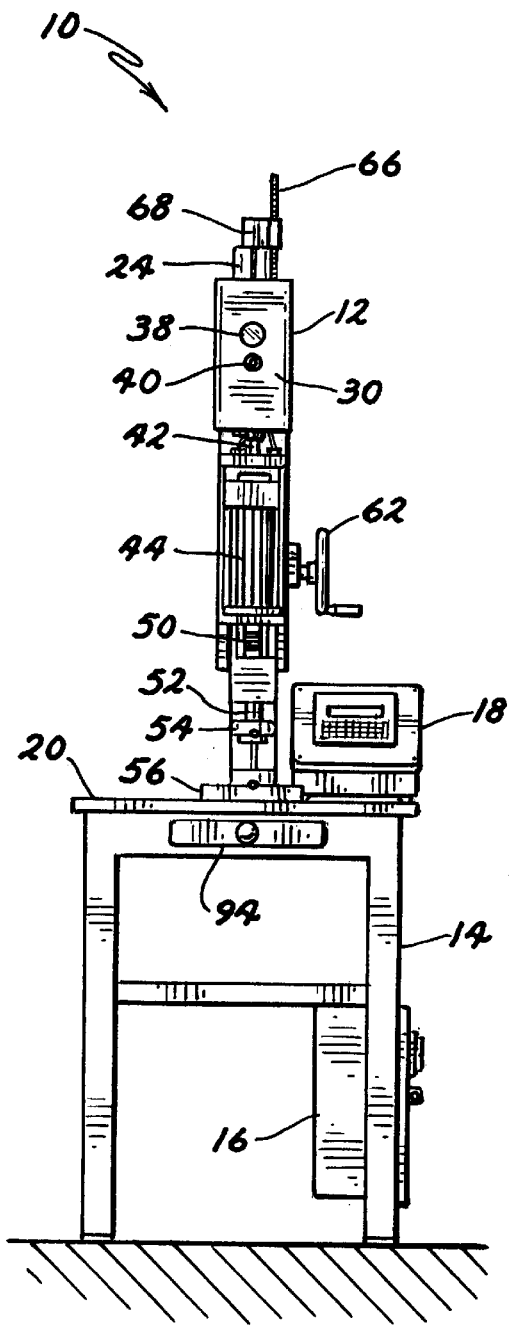
FIG. 1 is a front elevation view of one embodiment of the spin-welding machine of this invention.
Figure 2:
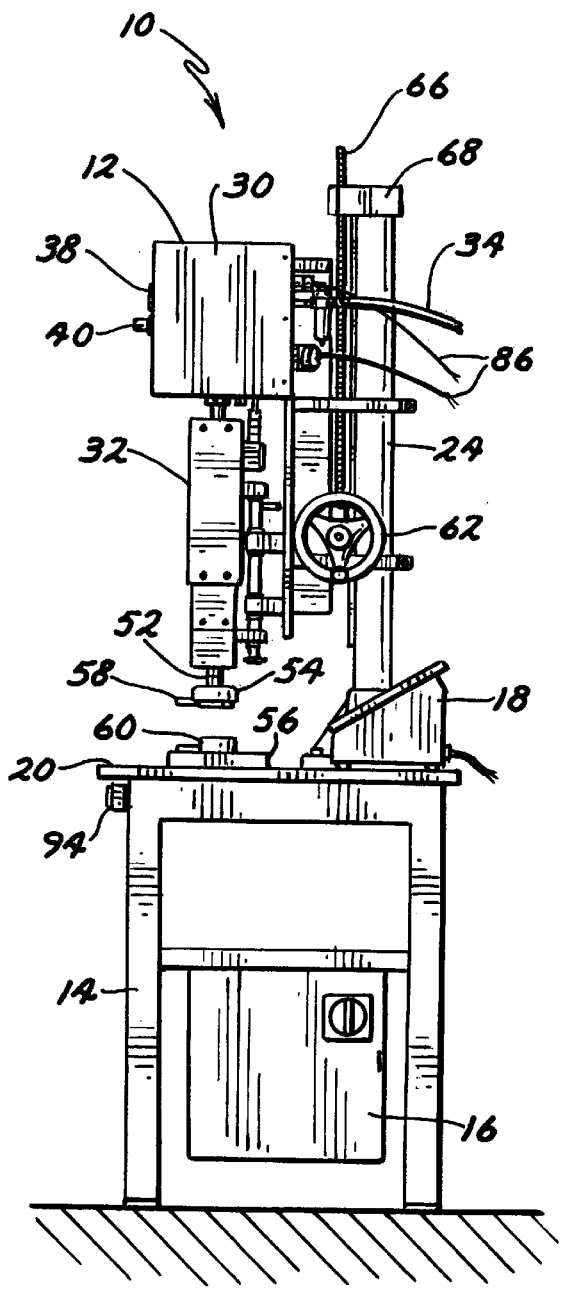
FIG. 2 is a right side elevation view of the spin-welding machine of FIG. 1.
Figure 3:
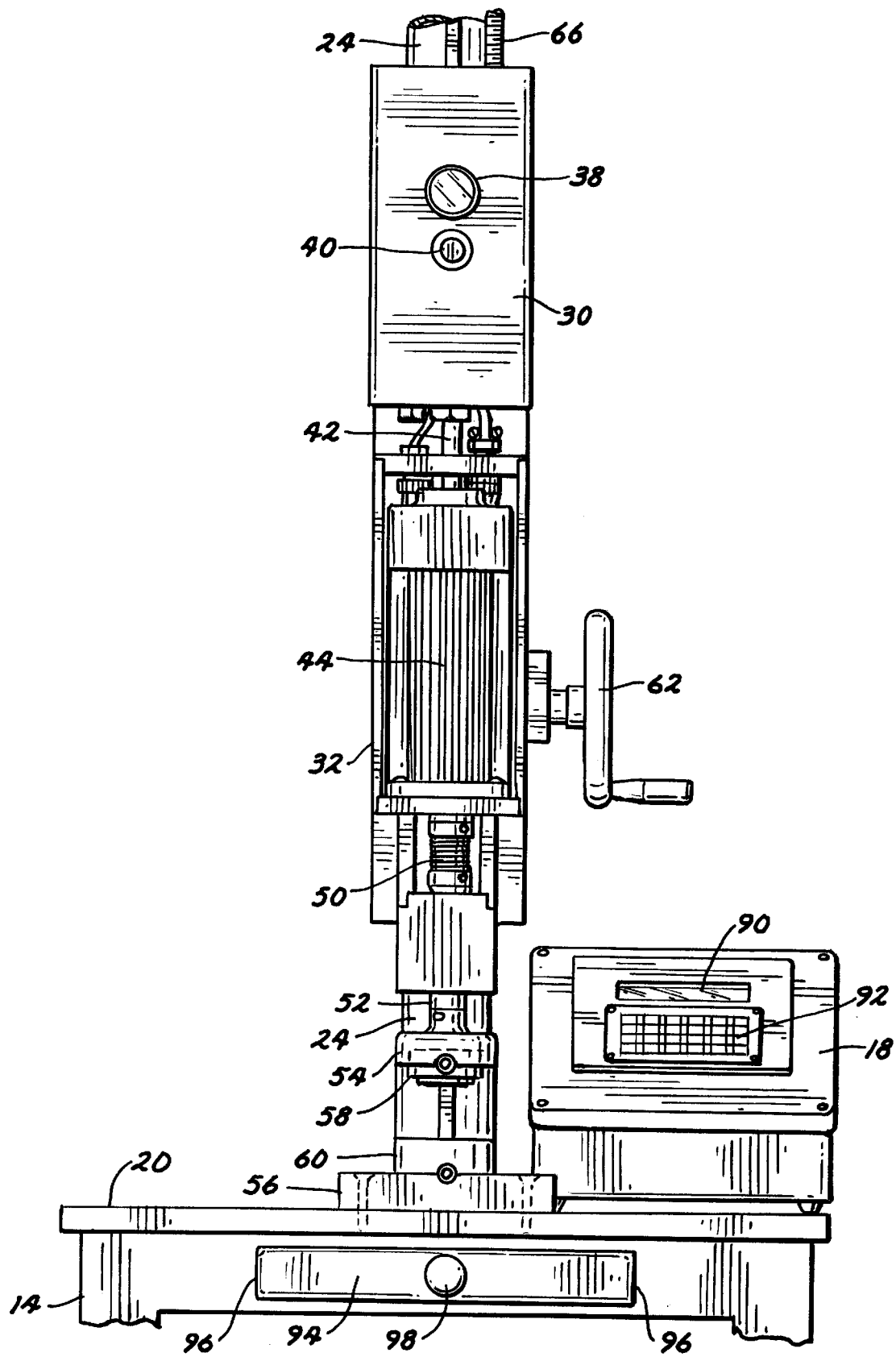
FIG. 3 is a detailed front elevation view of the spin-welding machine of FIG. 1.
Figure 4:
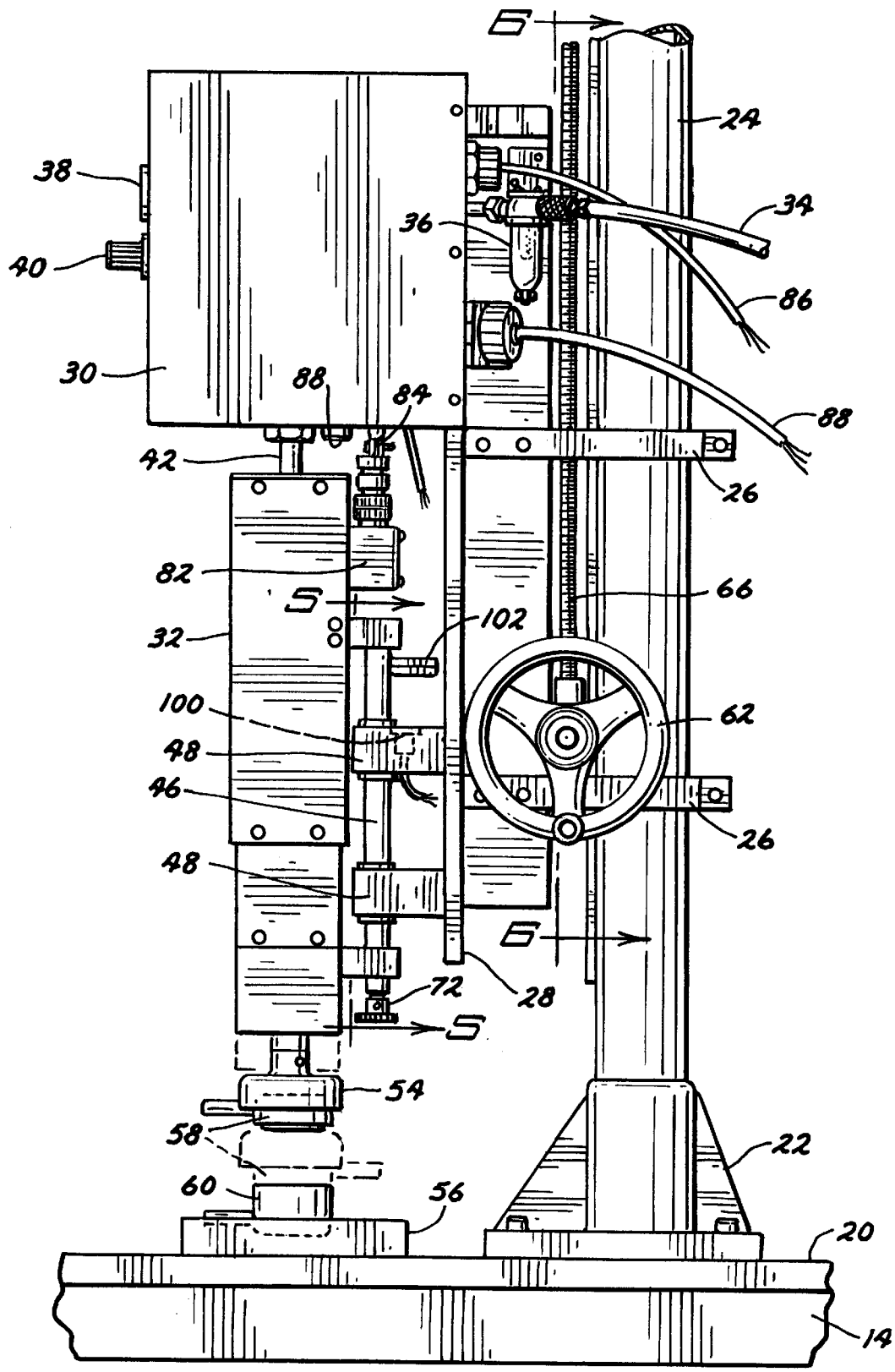
FIG. 4 is a detailed side elevation view of the spin-welding machine of FIG. 1.

The apparatus and method of this invention are illustrated in FIGS. 1–6 and referenced generally therein by the numeral 10. The apparatus, method, and inventive elements or components thereof are generally referred to interchangeably in this specification as the spin-welding system 10 for convenience.

Referring particularly to FIGS. 1–4, the spin-welding system 10 is embodied in a spin-welding machine 12 mounted on a pedestal 14 at a height suitable for a standing operator, and includes a processor 16 and operator interface 18 which are operatively connected to one another and to the spin-welding machine 12.

A generally horizontal platform 20 is disposed on top of the pedestal 14, and supports a bracket 22 and upright support 24 such as a generally vertical cylindrical shaft which are bolted or otherwise fixedly mounted or fastened to the platform 20. A pair of collars 26 circumscribe the upright support 24 in sliding and frictional engagement therewith, and may be selectively secured at a desired height relative to the upright support 24. The collars 26 are connected to a frame or carriage assembly 28 which is movable vertically relative to the platform 20 and upright support 24. An upper housing 30 is mounted on the carriage assembly 28 to move therewith, and the carriage assembly further includes a lower frame assembly 32 disposed beneath the upper housing 30 in generally vertical alignment therewith.

A pneumatic input line 34 extends from a source or reservoir (not shown) into the upper housing 30 through a conventional filter 36, regulator 38 and pressure gauge 40, and solenoid valve (not shown) to a dual-acting power cylinder 42.

A closed-loop control or "servo" motor assembly 44 is mounted at the depending lower end of the power cylinder 42 within the lower frame assembly 32 to move therewith. The lower frame assembly 32 includes a glide rod 46 which is slidably carried in a pair of guide collars 48 connected to the carriage assembly 28. A first bearing assembly 50 and second bearing assembly 52 are disposed in series depending from the lower end of the servo motor assembly 44, with the upper "chuck" portion 54 of the part holder operatively connected to the second bearing assembly 52. The lower "mandrel" portion 56 of the part holder is fixedly mounted to the platform 20 using any suitable fasteners, and the platform 20 preferably defines or incorporates mating receptacles arrayed in a predetermined mounting pattern. The upper member 58 and lower member 60 of the workpiece are engagingly received within the corresponding upper chuck portion 54 and lower mandrel portion 56 of the part holder. A metal bellows bearing has proven suitable for use as the upper bearing assembly 50, permitting the shaft in and shaft out to be slightly out of axial alignment or rotational synchronization.

The displacement or height of the carriage assembly 28 relative to the platform 20 may be selectively adjusted to accommodate workpieces and part holders of differing dimensions by rotating the height adjustment wheel 62, which in turn correspondingly rotates geared differential 64 and threaded shaft 66. Threaded shaft 66 extends through and is carried by a block 68 disposed proximate to the top end of the threaded shaft 66 and upright support 24, the lower end rotating freely within a bearing assembly 70 mounted on the lower collar 26. (Conversely, the upper end of the threaded shaft 66 could be fixed relative to the top of the upright support 24 and the carriage assembly 28 could move along the lower end of the threaded shaft 66.)

The initial displacement and therefore the stroke path of the servo motor assembly 44 relative to the carriage assembly 28 may be selectively adjusted by rotating the knob 72 disposed at the lower end of a threaded shaft 74 which extends through the pair of guide collars 48 on bearings 76, and which threadedly engages the lower carriage support 78 and is fixedly mounted to rotate relative to the upper carriage support 80. (As with the mechanism for adjusting the height of the carriage assembly 28, the threading arrangement for adjusting the stroke path may be reversed.)

A first electrical coupling 82 including a displaceable junction 84 extends between the upper housing 30 and the servo motor assembly 44, and a second electrical coupling 86 extends from the upper housing 30 to the processor 16, which is in turn operatively connected to the operator interface 18. The first and second electrical couplings 82, 86 transmit actuation and monitoring signals corresponding to activation of the solenoid valve and servo motor assembly 44, as well as a proximity sensor 88 or switch which governs the upper limit of movement of the power cylinder 42 and carriage assembly 28. A second proximity sensor 100 reads displacement from plate 102 so the processor 16 detects and controls the axial movement approaching the lower limit or hard stop, thereby forcing the operator to set and maintain a safe "crash" distance and preventing the chuck portion 58 and mandrel portion 56 from contacting if the workpieces unexpectedly burn through In addition to actuation signals, data including revolutions per minute (RPM) and feedback signals for the servo motor assembly 44, displacement of the power cylinder 42, applied "head" pressure exerted on the components, and signals from the proximity switch 88 or other operational or environmental sensors (i.e., thermal, temporal, spatial, etc.) are transmitted to and from the processor 16 for monitoring the operation of any necessary or desired functions of the spin-welding system 10. The operator interface 18 includes an alphanumeric visual display 90 and an input keypad 92 or other data input device which permit the operator to program or interact with the processor 16 and input predetermined values for variables corresponding to operating parameters or performance characteristics of the spin-welding system 10. A control module 94 is disposed on the front of the pedestal 14, and includes a pair of pressure-sensitive switches 96 or "palm buttons" disposed at opposing ends of the control module 94 which are operatively connected to the processor 16 and must be simultaneously depressed by the operator to enable operation of the spin-welding system 10 for linear or rotational movement, and an emergency stop or "kill" switch 98 which is operatively connected to the processor 16 and immediately disables operation of the spin-welding system 10 when depressed to terminate rotation of the servo motor assembly 44 and retract the power cylinder 42 and carriage assembly 28 to their uppermost position.

It will be readily appreciated by those of ordinary skill in the art that the various components and mechanical features of the spin-welding system 10 may be selected or constructed based upon a variety of engineering criteria and user preferences, and is to some extent dictated by operational parameters imposed by the nature and requirements of the particular welding application. The tolerances, specifications, and constraints associated with the spin-welding system 10 may be determined through a combination of design and experimental evaluation, again as influenced by any peculiarities of the anticipated welding application. It may also be appreciated that components may be obtained from a variety of sources and suppliers, and functional or structural equivalents may be interchanged with the particular components as described herein where suitable for the intended use.

As one representative example for use in welding a wide range of consumer and industrial plastic products, one servo motor assembly 44 which has proven suitable is an APEX 615X series stand-alone, single-axis servo drive/controller system available from Parker Motion & Control, which permits precise control over revolutions in the range of 1000 to 5000 RPM and signals from brushless resolver feedback or hall effect sensors for commutation. It is understood that different motors incorporating other closed-loop control systems may be utilized, and selection of other components will depend on the servo motor assembly 44 selected and the operating system or program being utilized.

While the structure and operation of a servo motor assembly 44 will be readily appreciated by those of ordinary skill in the art, a discussion of the basic principles and features of such a system is instructive to an understanding of the underlying method of using the spin-welding system 10 of this invention.

A servo motor assembly 44 is one representative example of a drive mechanism having a closed-loop control system that produces an error signal used to cancel any differences between the output and the input command, with the error signal driving an actuator which corrects the difference so that the output continuously agrees with the input. In block diagram format, the assembly 44 includes (in series): an input for a desired function, a summing point, a controller/amplifier module, a motor with a load attached, and an output. A sensing device receives a signal from the output and relays it back as an input to the controller/amplifier through the summing point. The output variable is measured, fed back, and compared to the desired input function at the summing point. The difference is a deviation or error which is amplified as part of the correction process, and which is used by the controller and actuator to adjust the operation of the motor to maintain a desired function level. For example, the sensing device might be a tachometer or other RPM sensor, with the input and output values being angular speed. The servo motor assembly 44 normally maintains a specific motor RPM (within a predefined range of error or deviation) despite variations in load conditions, ambient temperature, amplifier gain, or wear on the mechanical components.

Of course, closed-loop systems may be utilized in systems other than drive mechanisms, but for purposes of spin- or friction-welding, some form of a drive mechanism is inherently utilized. Closed-loop systems are generally classified in one of four categories: velocity control, position control, torque control, and incremental motion control. Velocity control systems usually comprise either a triangular profile (ramp up, ramp down) or trapezoidal profile (ramp up, hold at a specified velocity for a duration, ramp down), but more complex profiles such as S-curves and hysteresis loops may be utilized. In the servo motor assembly 44 as described above, a trapezoidal profile having a nearly vertical ramp down is desired for spin-welding in which radial alignment is accomplished. Position control systems usually utilize an optical encoder or resolver in the feedback loop to determine when the drive shaft arrives at a desired angular position by counting pulses and comparing them with an initial reference point and the input. A velocity control system may optionally be used to stabilize a position control system.

In torque control systems, the torque is proportional to motor current, with constant current being required to maintain desired torque. Incremental motion control systems permit switching between control systems, for example utilizing a velocity control system for normal operation but switching to a position control system to accurately stop the shaft at a desired orientation.

Method of Operation

Operation of the spin-welding system 10 includes a number of steps which must be performed by an operator, some of those steps being performed either to initially set up the spin-welding system to accommodate a particular welding procedure for a given workpiece, to obtain empirical or experimental data or perform subjective or objective evaluations of the resulting weld characteristics or quality, or to serially perform repeated welds on a number of actual workpieces. It may be readily appreciated that the steps described herein may be performed in differing or varying order as required or permitted by the particular welding procedure being performed. In addition, some steps may be omitted or other steps added as deemed suitable or desirable for particular welding applications.

Given the shapes and physical dimensions of the upper and lower members 58, 60 of the workpiece when engagingly received within the corresponding upper chuck portion 54 and lower mandrel portion 56 of the part holder, the height and stroke path of the servo motor assembly 44 and carriage assembly 28 are manually set by the operator using the corresponding adjustment wheel 62 and adjustment knob 72.

After the processor is booted and initialized using a MS-DOS, Windows®, Unix, or other operating system, the application program is loaded from ROM or EPROM memory or storage media. Upon startup, the application program resets the initial values of the system 10 and moves the components to their starting positions, and brings up a menu from which the operator may select different functions including data input, operation, and diagnostics or technical maintenance.

The operator inputs initial data for one or more variables based upon estimated performance parameters, given the physical and chemical properties of the materials being welded, the shapes of the parts, and the type of weld being formed. The operator performs a weld on two sample parts, and evaluates the resulting characteristics or quality of the weld using subjective or objective standards, as appropriate. The operator may then adjust one or more of the input parameters to vary the weld, and repeat the welding and evaluation process. Once a suitable or optimal weld is achieved, the parameters may be stored or recorded, and used for subsequent welding procedures.

Although many divergent variables may be utilized in controlling the weld characteristics and quality, several parameters have proven most useful in achieving optimal welding results for both free-oriented and radially-aligned workpiece parts. Those variables or parameters include: maximum relative rotational speed or angular velocity between the two portions 58, 60 of the workpiece (usually assuming one stationary portion 60 held in the lower mandrel portion 56 of the part holder) subsequent startup; maximum "head" pressure exerted by the power cylinder 42 and servo motor assembly 44 on the two portions 58, 60 being welded; the radial or angular position or orientation of the portions 58, 60 at startup and completion of the weld; the number of revolutions or angular distance traversed by the upper portion 58 once contact has been observed by the processor 16; the hold time during which the portions 58, 60 are maintained in contact under "dead" or stationary pressure after completion of the welding operation; and the threshold error or variance value interrogated from the closed-loop control system of the servo motor assembly 44 which demonstrates frictional contact between the portions 58, 60 of the workpiece at the beginning of the welding process when observed by the processor 16.

In one embodiment of the spin-welding system 10, the operator may input a desired motor RPM or "set speed," which represents the maximum running sped of the servo motor assembly 44 prior to contact between the two portions 58, 60 of the workpiece. The servo motor assembly 44 will normally not be actuated by the processor 16 unless the proximity switch 88 identifies the carriage assembly 28 and power cylinder 42 as being in their retracted or up positions. Upon actuation of a welding cycle, the servo motor assembly 44 will spin the upper "chuck" portion 54 of the part holder and the corresponding portion 58 of the workpiece immediately up to the angular velocity or RPM corresponding to the input set speed without an initial slow speed startup.

Once the set speed is achieved, the power cylinder 42 is actuated and the lower frame assembly 32, chuck portion 54 of the part holder, and upper portion 58 of the workpiece are lowered until the two confronting faces of the portions 58, 60 of the workpiece to be welded contact one another. The initial contact between the faces of the portions 58, 60 is considered to be detected or identified by the processor 16 receiving a signal from the feedback controller of the servo motor assembly 44 which exceeds the threshold error or variance value input by the operator, thus indicating that a predetermined amount of "drag" or torque is being applied opposing the rotation of the servo motor assembly 44 exclusively by friction between the portions 58, 60 of the workpiece. This value may typically range from a 0.5% to a 10% variance in servo error or gain, depending upon various factors such as the physical properties of the materials being welded, the particular moment of inertia of the combined upper portion 58 of the workpiece and the upper chuck portion 54 of the part holder, and so forth. A value of 0.5% has proven suitable for most applications, whereas values approaching 10% are required only in unusual circumstances, such as severly out-of-balance workpieces. (It may be appreciated that counterbalancing the chuck portion 54 and upper portion 58 of the workpiece may be necessary depending upon the particular shape and moment of inertia of those components.)

It should be noted that actual physical contact between the two portions 58, 60 of the workpiece is distinguishable from the point of initial contact as observed by the processor 16, with actual contact preceding observed contact by a time span generally proportional to the threshold error or variance value. For purposes of the spin-welding system 10, observed contact has proven suitable for accomplishing both weld optimization based upon rotational cycles following observed contact, and radial alignment of the two portions 58, 60 of the workpiece. It should also be noted that the measured drag or torque on the servo motor assembly 44 due to frictional contact between the two portions 58, 60 of the workpiece may decrease slightly as the mating surfaces of the two portions 58, 60 begin to melt and liquefy, the span of this decrease in drag or torque being related in a generally inversely proportional manner to the linear speed and axial pressure with which the upper portion 58 is moved into contact with the lower portion 60. In appropriate circumstances or applications, this decrease in drag or torque may also be considered the observed point of contact between the two portions 58, 60 of the workpiece, however such an embodiment would require a suitable application program and monitoring both a decrease and subsequent increase in the angular velocity of the servo motor assembly 44, with one or two corresponding threshold values.

Although it has not proven necessary for achieving either optimal weld characteristics or radial alignment between the two portions 58, 60 of the workpiece in all applications, the processor 16 may note the angular position or radial orientation of the upper portion 58 of the workpiece (and therefore the relative orientation or relationship between the two portions 58, 60 of the workpiece) at the time contact is observed. As such, the commutation system preferably permits both precise monitoring of RPM and radial orientation, so that the spin-welding system 10 may be utilized for free-orientation and radially-aligned welding applications.

Once contact is observed by the processor 16, the specific number of revolutions are counted using the signal interrogated from the commutation sensor and corresponding control system of the servo motor assembly 44, up to the specific number of revolutions or angular distance input by the operator. The servo motor assembly 44 is programmed via the processor 16 and monitored via the feedback control loop so that the servo motor assembly 44 ceases its rotation upon completion of the designated number of revolutions or cycles. The process, in practice, appears to be substantially continuous and integrated. It has proven suitable to utilize a servo motor assembly 44 and feedback control loop capable of discriminating 4096 steps per revolution, with an acceleration on the order of 500 revolutions per second per second ($r/s^2$) and a nominal deceleration on the order of 1200 $r/s^2$. Of course, it is understood that the deceleration rate will be varied continuously by the feedback control loop depending upon prevailing physical conditions including the speed and angular position of the servo motor assembly 44 so that rotation ceases exactly upon completing the designated number of revolutions, or achieving the predetermined angular orientation. In the case of a welding cycle in which the number of revolutions is the controlling parameter, the angular "stopping distance" will be determined based upon the number X of revolutions desired after contact is observed. In the case of a welding cycle in which the final angular orientation of the servo motor assembly 44 (and therefore the portions 56, 58 of the workpiece) is the controlling parameter, the angular "stopping distance" will be determined based upon the number X of revolutions desired after contact is observed, plus the number of incremental steps N required to rotate the servo motor assembly 44 from the angular position at which X rotations occurs to its desired or predetermined angular stopping orientation. Once the proper number of revolutions or angular orientation is accomplished, the necessary current is maintained to the servo motor assembly 44 to hold the angular position constant and angular velocity as zero.

It will be appreciated by those skilled in the art that the number of revolutions specified may be a whole integer value (for example "9") or may comprise some integer and fraction of a rotation (such as "6.5" or "5.25"), although it has proven suitable to utilize only integer values while maintaining acceptable control over weld optimization. Alternately, to achieve a desired radial alignment between the two portions 58, 60 of the workpiece upon completion of the weld, the processor may be programmed to count the specified number of revolutions or angular distance from the contact point to an end point aligned radially with the contact point, and then proceed the additional fraction of a revolution from that end point to a stopping point having a predetermined radial orientation relative to the platform 20, lower mandrel portion 56 of the part holder, and lower portion 60 of the workpiece.

Similarly, to facilitate efficient or automated loading of workpieces, it may be preferable to have the upper chuck portion 54 of the part holder return to a particular radial position at the termination of each complete welding cycle or operation, in which case the same procedure of counting a specified number of revolutions followed by a fraction of a revolution will be used, even though no radial alignment between the two portions 58, 60 of the workpiece is required.

Once rotation of the two portions 58, 60 of the workpiece relative to one another has ceased, the two portions 58, 60 of the workpiece may be maintained in contact under the desired "dead" pressure for the indicated hold time, followed by the power cylinder retracting the carriage assembly 28, servo motor assembly 44, and chuck portion 54 of the part holder from the fully extended position back to the fully retracted position. The proximity sensor 88 detects this retraction and the completion of one full welding cycle.

The two welded portions 58, 60 of the workpiece formed into a product will normally remain within one of the part holders. The product may be manually removed by the operator, further processed or tested prior to removal, or removed using automated material handling equipment. Two new portions 58, 60 of the workpiece forming the next product may be inserted into the respective chuck portion 54 and mandrel portion 56 of the part holder, and the welding cycle repeated.

While the embodiment of the spin-welding system 10 described herein uses a single servo motor assembly 44 oriented in a vertical configuration with a rotating chuck 54 and stationary mandrel 56, it will be readily appreciated by those skilled in the art that a variety of other configurations may be contemplated.

For example, the system 10 as described above may be oriented transversely in a generally horizontal position, or embodiments may be configured to perform multiple simultaneous welds using two confronting systems oriented in either vertical or horizontal alignment. Two portions 58, 60 of the workpiece could be welded to a third intermediate portion, or two portions 58, 60 may be welded together with both portions 58, 60 being rotated. Two systems 10 may be configured with their respective longitudinal axes oriented at obtuse or acute angles to weld portions 58, 60 to a third component, or a single system 10 may be disposed at a non-vertical angle relative to a stationary mandrel 56. It may also be appreciated that the system 10 may be utilized with drive mechanisms that do not induce purely rotational motion, but rather transmit transverse motion along an orbital (repeating or non-repeating), non-circular, eccentric, reciprocal, or random vibratory path to one or both of the portions 58, 60. In such a circumstance, the orbital motion may be induced by a differential coupled to a servo motor assembly 44, or a drive system operating using a distinct mechanical principle. In such a case, setting parameters to optimize the weld characteristics or assure alignment may entail calculations other than angular distance or revolutions, but will similarly depend on monitoring and controlling the relative path traversed by the two components over a determined time period, with the three critical variables similarly being the imparted friction, path length or extent of relative displacement, and duration of contact between the two portions 58, 60.

In addition to the disclosure set forth above, the teachings of the prior art references submitted with this specification or subsequently incorporated into the file history hereof are incorporated by reference as though fully set forth in their entirety for the purpose of and to any extent they amplify the teachings contained herein of provide suggestions to those of ordinary skill in the art regarding modifications, substitutions, adaptations, variations, or improvements to the spin-welding system 10 or method of this invention, or their interchangeability with components thereof.

While the preferred embodiments of the above spin-welding system 10 and its method of use have been described in detail with reference to the attached drawings Figures, it is understood that various changes, modifications, and adaptations may be made in the spin-welding system 10 without departing from the spirit and scope of the appended claims.

What is claimed is:

1. A method of welding a first part to a second part, said method utilizing a drive mechanism having a closed-loop control system, a part holder coupled thereto for engagingly securing said first part, and a sensor for measuring an output from said drive mechanism, said sensor producing an output signal which is fed back to a controller in said closed-loop control system, said method comprising the steps of:

providing the drive mechanism having the closed-loop control system, the part holder coupled, and the sensor for measuring the output from the drive mechanism;

mounting the first part on the part holder coupled to the drive mechanism;

actuating the drive mechanism to move the first part transversely in a path relative to the second part at a predetermined rate;

moving the first part axially into close confronting contact with the second part;

observing frictional contact between the first part and the second part, said frictional contact being determined by measuring a predetermined variation in the load on the drive mechanism; and calculating when the first part traverses a displacement path relative to the second part after frictional contact is observed, said displacement path being sufficient for the frictional contact between the first part and the second part to produce a weld therebetween, such that the drive mechanism ceases its transverse movement upon completion of the first part traversing said displacement path.

2. The method of claim 1 wherein the predetermined rate at which the drive mechanism moves the first part transversely relative to the second part is generally constant.

3. The method of claim 1 wherein the path which the drive mechanism moves the first part transversely relative to the second part is generally rotational.

4. The method of claim 1 wherein the path which the drive mechanism moves the first part transversely relative to the second part is generally orbital and repeating.

5. An apparatus for spin-welding a first part to a second part, said first part being engagingly received in a chuck and said second part being engagingly received in a mandrel, said apparatus comprising:

a support frame;

a carriage mounted on said support frame for axial movement relative thereto;

a reciprocating mechanism operatively connected to said support frame and said carriage so as to move said carriage axially relative to said support frame between a retracted position and an extended position;

a drive mechanism operatively connected to said carriage for axial movement therewith, said drive mechanism including a closed-loop control system and a sensor for measuring an output from said drive mechanism, said sensor producing an output signal which is fed back to a controller in said closed-loop control system, the chuck holding the first part being mounted on said drive mechanism and oriented such that when said carriage and said drive mechanism are moved axially to said extended position the first part will frictionally contact the second part;

a processor operatively connected to said drive mechanism and said reciprocating mechanism, said processor including a memory for storing a plurality of input values corresponding to a predetermined set speed, a predetermined variation in said output from said drive mechanism, and a predetermined number of rotations, such that said processor:

actuates said drive mechanism to rotate the first part at said predetermined set speed, actuates said reciprocating mechanism to move the first part into close confronting contact with the second part, observes frictional contact between the first part and the second part by measuring said predetermined variation in said output from said drive mechanism, and counts said predetermined number of revolutions of said drive mechanism after frictional contact is observed, said predetermined number being sufficient for the frictional contact between the first part and the second part to produce a weld therebetween, such that rotation of said drive mechanism ceases upon completion of said predetermined number of revolutions, causing rotation of said drive mechanism and the first part to cease.

6. The apparatus of claim 5 wherein the servo motor is of the velocity control type.

7. The apparatus of claim 5 wherein the servo motor is of the position control type.

8. The apparatus of claim 4 wherein the reciprocating drive is a dual-acting power cylinder.

9. The apparatus of claim 8 wherein the dual-acting power cylinder is a pneumatic cylinder.

10. The apparatus of claim 5 wherein the drive mechanism is a servo motor having a closed-loop control system and imparts rotation to the first part.

11. The apparatus of claim 10 wherein the sensor measures the revolutions per time period of the servo motor.

12. A method of spin-welding a first part to a second part, said method utilizing a drive mechanism having a closed-loop control system, a part holder coupled thereto for engagingly securing said first part, and a sensor for measuring an output from said drive mechanism, said sensor producing an output signal which is fed back to a controller in said closed loop control system, said method comprising the steps of:
providing the drive mechanism having the closed-loop control system, the part holder coupled, and the sensor for measuring the output from the drive mechanism;
mounting the first part on the part holder coupled to the drive mechanism;
actuating the drive mechanism to rotate the first part at a predetermined set speed;
moving the first part into close confronting contact with the second part;
observing frictional contact between the first part and the second part, said frictional contact being determined by measuring a predetermined variation in the load on the drive mechanism; and
counting a predetermined number of revolutions of the drive mechanism after frictional contact is observed, said predetermined number being sufficient for the frictional contact between the first part and the second part to produce a weld therebetween, such that rotation of the drive mechanism and the first part ceases upon the completion of said predetermined number of revolutions.

13. The method of claim 12 wherein the frictional contact is observed at a first point having a radial orientation, and wherein the predetermined number of revolutions of the drive mechanism after frictional contact is observed includes at least an integer number of revolutions such that a portion of the first part has a radial orientation corresponding to said point at which frictional contact was observed after the integer number of revolutions is completed, and a fraction of a revolution corresponding to the angular separation between said first point and a second point at which the portion of the first part is disposed such that the predetermined radial alignment between the first part and the second part exists.

14. The method of claim 12 wherein the step of moving the first part into close confronting contact with the second part is performed by a dual-acting power cylinder, the first part being engagingly received within a chuck operatively connected to said dual-acting power cylinder for axial movement therewith.

15. The method of claim 12 wherein the predetermined number of revolutions of the drive mechanism subsequent to observing frictional contact is an integer value.

16. The method of claim 12 wherein the step of counting the predetermined number of revolutions of the drive mechanism subsequent to observing contact such that the drive mechanism ceases rotation at the completion of the predetermined number of revolutions further comprises the step of:
adding to the predetermined number of revolutions a partial revolution representing the angular distance between a point at which contact is observed and a predetermined angular orientation to obtain a target number of revolution, said target number of revolutions counted being such that rotation of the drive mechanism and the first part ceases at said predetermined angular orientation such that the first part and the second part have a predetermined radial alignment therebetween.

17. The method of claim 16 wherein the predetermined number of revolutions includes an integer number and a fraction of a revolution.

18. The method of claim 12 wherein the step of moving the first part into close confronting contact with the second part further comprises the step of:
applying a predetermined axial pressure on the first part in the direction of the second part so as to impart increased friction between the first part and the second part.

19. The method of claim 18 wherein after the step of deactuating rotation of the drive mechanism at the completion of the predetermined number of revolutions, the method further comprises the step of:
maintaining at least a portion of the predetermined axial pressure on the first part in the direction of the second part for a predetermined duration subsequent to cessation of rotation of the first part to ensure that the weld is suitably stable.

20. The method of claim 12 wherein the drive mechanism is a servo motor.

21. The method of claim 20 wherein the servo motor is of the velocity controlled type.

22. The method of claim 20 wherein the servo motor is of the position controlled type.

23. The method of claim 12 wherein the drive mechanism is operatively connected to a processor and an operator initially and selectively enters a plurality of input values corresponding to the predetermined set speed, the predetermined variation in the output from the drive mechanism, and the predetermined number of rotations.

24. The method of claim 23 wherein an input signal is provided to the drive mechanism and the predetermined variation in the output from the drive mechanism is an increase in error between said input signal and the output signal, and wherein the input value corresponding to the predetermined variation in the output from the drive mechanism is a percentage value.

25. The method of claim 23 wherein the input value corresponding to the predetermined set speed is a number of revolutions per time period.

26. The method of claim 25 wherein input value corresponding to the predetermined set speed is measured in revolutions per minute (RPM).

27. The method of claim 12 wherein an input signal is provided to the drive mechanism and the predetermined variation in the load on the drive mechanism is an increase in error between said input signal and the output signal, said error exceeding a predetermined threshold value.

28. The method of claim 27 wherein the input signal corresponds to the predetermined set speed for rotation of the drive mechanism, and the output signal corresponds to an actual rotational speed of the drive mechanism measured by the sensor.

29. The method of claim 28 wherein the predetermined threshold value of the error is between approximately 0.5% and 10% of the predetermined set speed.

30. The method of claim 28 wherein both the predetermined set speed for rotation of the drive mechanism and the actual rotational speed of the drive mechanism are measured in revolutions per minute (RPM).

* * * * *